United States Patent [19]
McGovern et al.

[11] Patent Number: 6,128,959
[45] Date of Patent: Oct. 10, 2000

[54] DRIVELINE VIBRATION ANALYZER

[75] Inventors: Kevin M. McGovern, Plymouth; John J. Bair, Plainwell; Anthony N. West, Highland; David S. Totten, Farmington Hills; David W. Malaney, West Bloomfield, all of Mich.

[73] Assignee: Eaton Corporation, Cleveland, Ohio

[21] Appl. No.: 09/133,131

[22] Filed: Aug. 13, 1998

Related U.S. Application Data

[63] Continuation-in-part of application No. 08/650,565, May 20, 1996, abandoned, which is a continuation of application No. 08/335,275, Nov. 7, 1994, abandoned.

[51] Int. Cl.$^7$ ............................................. G01M 13/02
[52] U.S. Cl. ............................................. 73/660; 73/460
[58] Field of Search ........................... 73/660, 650, 659, 73/570, 460; 324/160, 161, 162; 340/683; 701/71, 111

[56] References Cited

U.S. PATENT DOCUMENTS

| | | | |
|---|---|---|---|
| 4,426,641 | 1/1984 | Kurihara | 73/660 |
| 4,452,074 | 6/1984 | Shelomentsev et al. | 73/660 |
| 5,012,417 | 4/1991 | Watanabe | 701/71 |
| 5,187,434 | 2/1993 | Ando | 73/660 |
| 5,365,787 | 11/1994 | Hernandez et al. | 73/660 |
| 5,412,985 | 5/1995 | Garcia | 73/460 |
| 5,955,674 | 6/1984 | McGovern et al. | 73/660 |

*Primary Examiner*—Helen C. Kwok
*Attorney, Agent, or Firm*—Loren H. Uthoff, Jr.; Howard D. Gordon

[57] ABSTRACT

A diagnostic driveline vibration analyzing tool for measuring and characterizing the torsional vibrations in a vehicle driveline. An electronic control unit and sensor cooperate to measure speed fluctuations occurring between the passing of adjacent teeth of a rotating gear. These time measurements are the basis for displacement, velocity and acceleration calculations which, combined with driveshaft rotational order information, can be used to pinpoint the source of excessive driveline torsional vibrations.

4 Claims, 4 Drawing Sheets

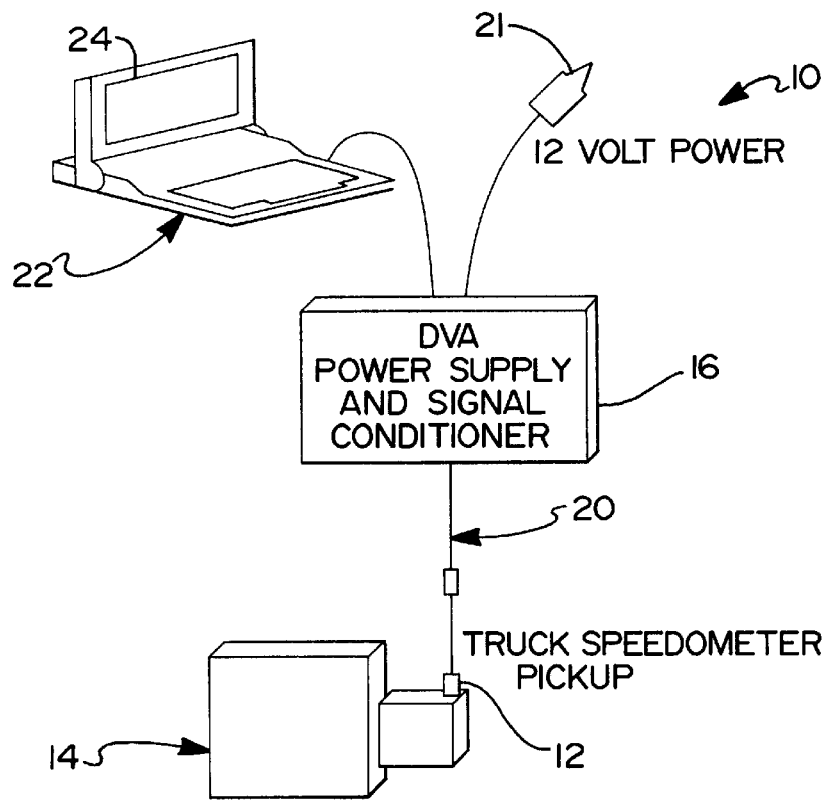
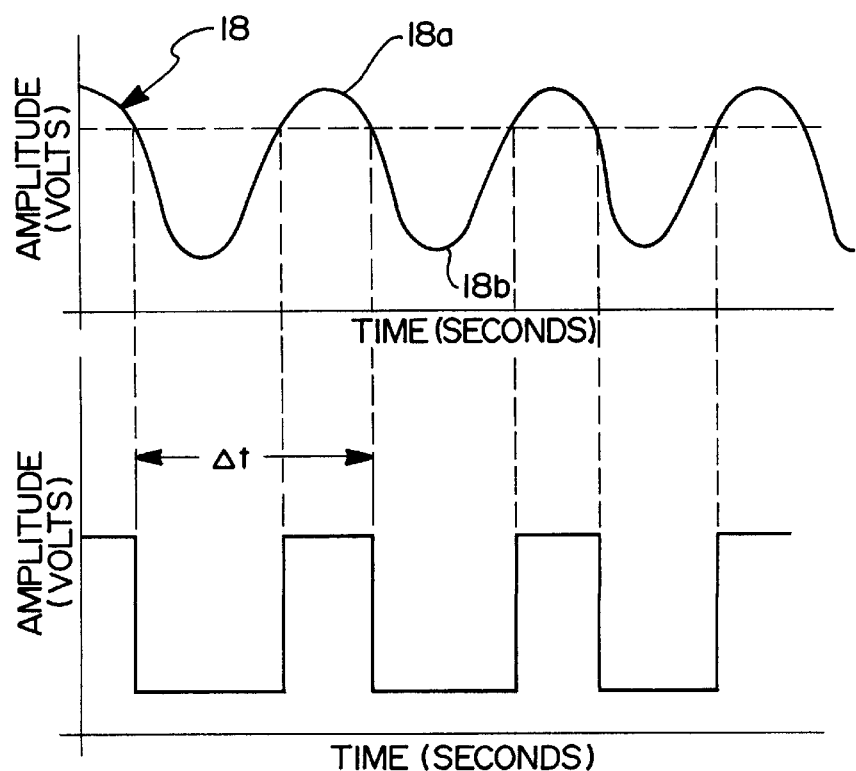

DRIVELINE VIBRATION ANALYZER

This is a Continuation-in-Part of application Ser. No. 08/650,565, filed May 20, 1996, now abandoned, which is a continuation of Ser. No. 08/335,275 filed Nov. 7, 1994, now abandoned.

BACKGROUND AND SUMMARY OF THE INVENTION

This invention relates generally to vehicle vibration diagnostics and, more particularly, to a system and method for measuring and evaluating torsional vibration in a vehicle driveline.

Driveline torsional vibration problems are a significant source of premature driveline component failures as well as customer noise and vibration complaints, especially in heavy duty trucks. Damaged driveline components are frequently replaced in the field without addressing the root cause of the failure, only to result in a similar failure in the future. Noise and vibration problems are routinely addressed by swapping out driveline components until the problem is seemingly resolved, even in instances when the problem may not even be driveline related. Both situations yield high warranty costs for the component supplier and OEM, and increase the fleet owner's truck down time.

To eliminate this prevalent "trial and error" approach to truck driveline troubleshooting, the driveline vibration analyzer (DVA) of the present invention was developed to quantitatively measure and evaluate driveline torsional vibration. To accomplish this, the DVA measures cyclic speed variations in rotating driveline components and correlates the torsional vibration amplitude to the rotational order of the driveshaft. These speed variations are converted to displacement and acceleration information and separated according to the harmonic order of the driveshaft in order to measure the driveline response to engine and universal joint torsional excitations. Using preselected or calculated orders of interest, the magnitudes of the sensed vibrations in terms of acceleration are compared with predetermined thresholds to aid a test technician in identifying potential vibration problems, determining the source of any problems encountered and selecting a proper remedy for each problem.

The DVA was designed to function as both a torsional vibration analysis instrument as well as a simple field tool suited for rapid troubleshooting. An experienced DVA operator can perform a complete DVA in less than half a day. Implementing the DVA on a laptop personal computer provides portability and enables use by service technicians in a variety of ways to diagnose and solve torsional vibration problems.

These and other features and advantages of the present analyzer will become apparent upon review of the following disclosure taken in conjunction with the accompanying drawings.

BRIEF DESCRIPTION OF THE DRAWINGS

FIG. 1 is a schematic view of the present invention implemented as a field diagnostic tool.

FIG. 2 is a graphical representation of the signal produced by the magnetic speed sensor of the present analyzer.

FIG. 3 is a graphical representation of the signal shown in FIG. 2 after conversion into a square waveform.

DETAILED DESCRIPTION OF THE PREFERRED EMBODIMENT

Figure 4:
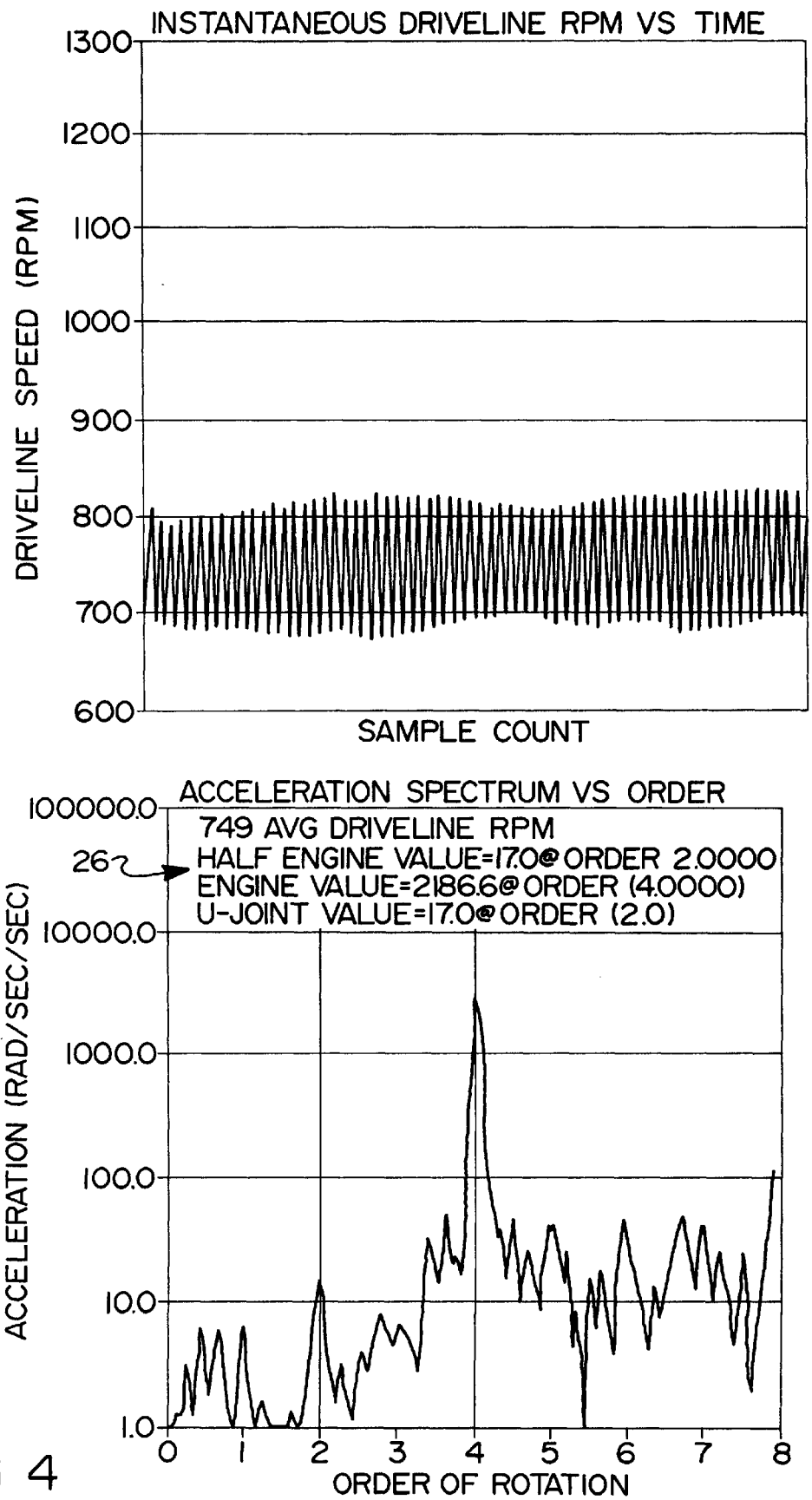
FIG. 4 is a graphical representation of a plot produced by the DVA illustrating measured driveline speed and acceleration for a driveline system under test.

Turning now to the drawings, and in particular to FIG. 1, the present driveline vibration analyzer (DVA) is indicated generally at 10. DVA 10 includes a sensor for measuring the rotational speed of a particular driveline component, in the presently preferred embodiment of the invention a magnetic speed sensor 12. Sensor 12 is a non-contact magnetic sensor, such as a variable reluctance sensor, which provides speed or timing data in the form of a pulse train. In this instance sensor 12 is one already present within most modern class 8 truck transmissions, such as transmission 14, to provide a vehicle speedometer signal and is easily reachable from the rear of the transmission. An appropriate signal conditioning unit 16 may also be provided to filter and reduce noise in the signal output by sensor 12.

Sensor 12 provides a clean sixteen pulse per revolution (one pulse for each tooth on a sixteen toothed wheel which rotates with the output shaft of transmission 14) sinusoidal tach signal 18, such as illustrated graphically in FIG. 2. Note that a signal peak 18a is created by a strong magnetic field occurring as a tooth passes near sensor 12, and a valley 18b is created when the sensor is positioned between passing teeth. While sensor 12 measures rotational speed or velocity at the output of transmission 14, it is sensitive to all significant driveline torsional excitation sources. Although the transmission output location is typically not the point of highest torsional vibration in the driveline, it has been shown to be sufficiently torsionally active under both engine and universal joint excited vibration to accurately assess driveline torsional behavior.

Alternately, however, any other suitable means could be provided for accurately measuring the rotational speed of a particular driveline component of interest. For instance, an alternate embodiment may include a similar magnetic sensor adapted to measure the rotational speed between passing teeth of a suitable test fixture affixed for test purposes to the particular driveline component of interest such as an input or output yoke of a vehicle transmission or drive axle. An optical sensor could also be used to indicate the passing of markings or indentations made on a particular rotating driveline component.

Sensor 12 is electrically coupled via a lead 20 to a microprocessor-based electronic control unit (ECU) 22, preferably through signal conditioning unit 16. Unit 16 may also be configured to provide power for ECU 22, such as through the vehicle cigar lighter 21. ECU 22 may include a personal computer, preferably a portable laptop computer, or any other suitable processor. ECU 22 in the present exemplary embodiment is implemented off-board the vehicle in a diagnostic field test application, but with requisite computer power and alternate design choices could alternately be implemented permanently on-board a vehicle as a separate processor or as part of a vehicle's engine or transmission controller. ECU 22 includes a high speed continuous period counter board for generating accurate time pulses of uniform frequency to be associated with the measurements obtained by sensor 12. The number of pulses are in effect counted between the sensed passage of each tooth. It can be appreciated that at very high rpms, this information is acquired quite rapidly.

The time measurement for each tooth is related to the instantaneous driveline angular velocity at the point of measurement. A gear with n teeth therefore enables n measurements of angular velocity per revolution of the gear. The following definitions apply to the present driveline vibration measurement system:

Δt=time measurement between consecutive gear teeth

N=number of data samples (preferably a power of 2)

Δθ=2π/n=angular displacement between any consecutive gear teeth dθ/dt=Δθ/Δt=instantaneous driveline angular velocity $$\varpi = \frac{N*(\Delta\theta)}{\sum_{j=0}^{N-1}(\Delta tj)} = \text{average driveline angular velocity}$$

$K_j$ = order value for spectral line $j$

Conversion of the sensor output signal illustrated in FIG. 2 into a square waveform as shown graphically in FIG. 3 is one manner in which ECU 22 can perform quantization the time passing between each pair of adjacent teeth. This "time between teeth" can be represented as Δt. Alternately, however, any other suitable method known to those having skill in the art for determining Δt from signal 18 could also be used. Knowing that the angular displacement between two adjacent teeth is equal to 2π divided by the number of teeth, the angular velocity dθ/dt can be calculated readily.

Because the velocity measurements are evenly spaced in terms of the gear rotation angle, application of a discrete Fourier transform to the angle domain velocity data results in a transformation of data into the order domain. This can be accomplished in any suitable method, in the presently preferred embodiment by a commonly available commercial FFT (fast Fourier transform) software package run on ECU 22. The Fourier transformation is particularly useful since it enables calculation of the torsional displacement and acceleration magnitudes in the driveline as a function of the harmonic order of rotation of the driveshaft.

Since the velocity measurements are evenly spaced in terms of Δθ, application of a discrete Fourier transform to this angle domain data results in transformation into the order domain. Because the input data contains real values only, the double sided FFT (positive as well as negative order) block has real and imaginary components which are equal. Disregarding the negative order data, the FFT function puts the real and imaginary components Rj and Ij into separate blocks having total of 1+N/2 elements with index j=0,1, ..., N/2. The relationship between the harmonic order K and the index j is thus:

$$K_j = j*\frac{\frac{n}{2}}{\frac{N}{2}} = j*\left(\frac{n}{N}\right)$$

$$K_{max} = \frac{n}{2} = \text{max order}$$

$$\Delta K = \frac{n}{N} = \text{order resolution}$$

DVA 10 is able to calculate all driveshaft vibration orders up to one-half of the number of gear teeth. Therefore, DVA 10 is sensitive to U-joint excited torsionals, which are constant second order in all transmission gears. Engine excited vibration can be analyzed in all transmission gears up to a maximum gear ratio equal to one-half of the number of teeth divided by the engine crankshaft vibration order. For example, the fundamental engine firing order for a six cylinder 4-cycle engine is the third crankshaft order. With a sixteen tooth gear, DVA 10 could thus analyze engine firing data in all gear ratios less than 2.67. Because engine excited torsionals are of greatest concern in the high range transmission gears, a sixteen tooth gear or wheel is thus adequate. In addition, the order resolution can be improved by increasing the size of the sample. For example, using the same gear and a sample size of 256, DVA 10 will record 16 shaft rotations and can resolve torsional vibration to the nearest 1/16 order.

At each rotational order of the crankshaft, ECU 22 produces velocity magnitude data. From this velocity data, displacement and acceleration can also be calculated in a manner well known to those having skill in the art. After the real and imaginary components are normalized, the magnitude of the velocity spectrum is calculated for each Kth order component from:

$$A_K = \sqrt{a_k^2 + b_k^2} = \text{velocity magnitude}$$

From the above angular velocity magnitude spectrum, the torsional displacement and acceleration magnitudes in the driveline are calculated as a function of the harmonic order of rotation. This is derived as follows:

$$\left(\frac{d\theta}{dt}\right)_K = A_K * \cos(\varpi_K * t)$$

$$\theta_K = \frac{A_K}{\varpi_K} * \sin(\varpi_K * t)$$

$$\frac{d^2\theta}{dt^2} = -A_K * \varpi_K * \sin(\varpi_K * t)$$

by substituting $\omega_K = \overline{\omega}*K$ into the equations for the maximum (magnitude displacement, velocity and acceleration:

$$(\theta)_{max} = \frac{A_K}{\varpi * K}$$

$$\left(\frac{d\theta}{dt}\right)_{max} = A_K$$

$$\left(\frac{d^2\theta}{dt^2}\right)_{max} = A_K * \varpi * K$$

Details of these calculations are, however, provided in SAE paper No. 942324 entitled "DVA-A New Tool for the Trucking Industry", McGovern et al, presented on Nov. 8, 1994, incorporated herein by reference. These values are preferably formatted and plotted on a suitable display device 24 coupled to, or part of, ECU 22.

Figure 5:
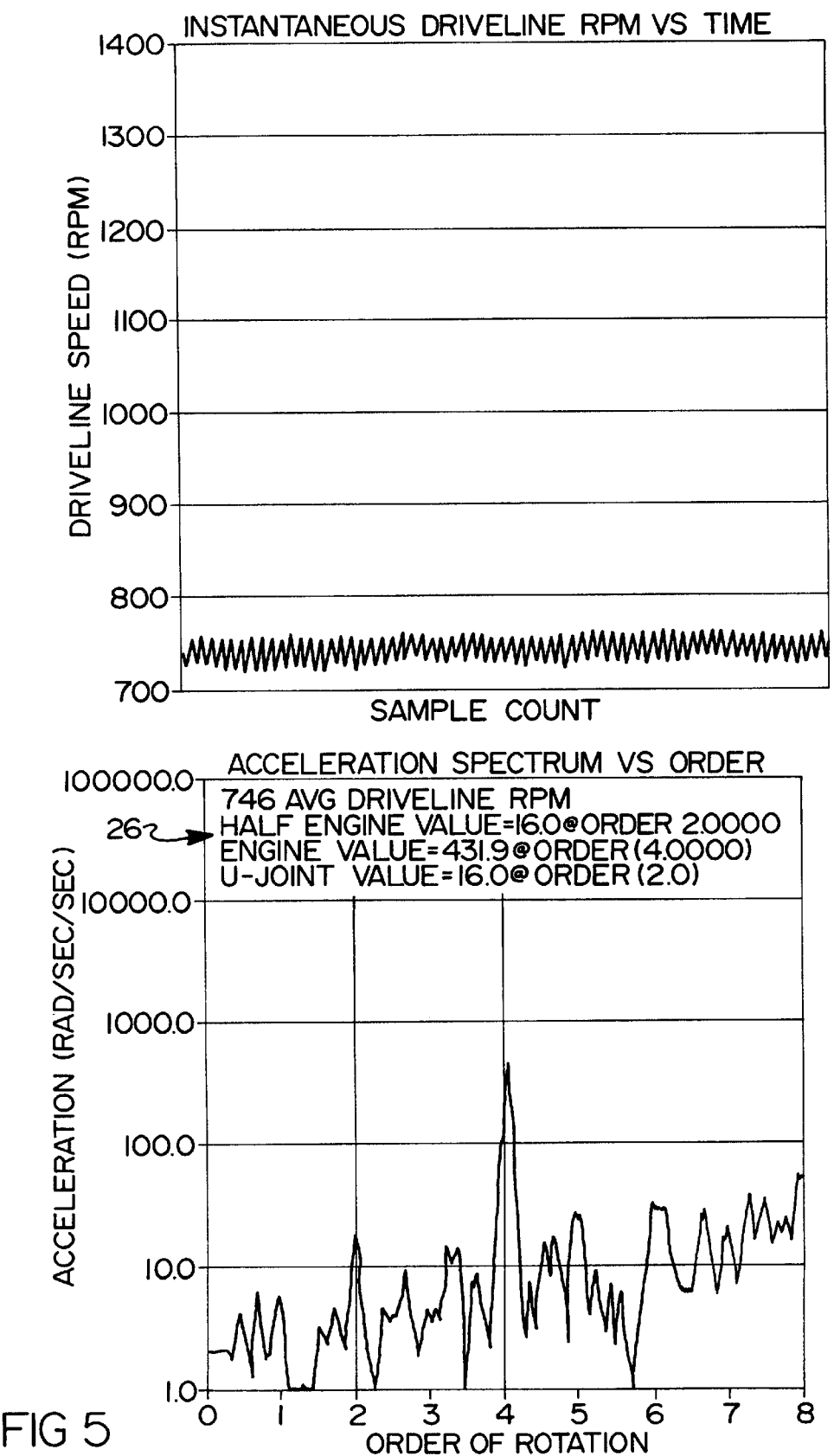
FIG. 5 is a graph similar to FIG. 4 of the same driveline after a soft clutch was installed to remedy excessive torsional vibration.

One way to present information to the DVA operator is in the manner illustrated in the graphs of FIGS. 4 and 5. As shown therein, driveline speed (in rpm) is plotted over time in FIGS. 4a and 5a. One of skill in the art will readily appreciate that a driveline rotating at a perfectly constant rotation free from torsional vibration would produce a straight horizontal line in this graph. Calculated acceleration and displacement are plotted relative to driveshaft rotational order in FIGS. 4b and 5b. Preferably, orders of particular interest, and the magnitude of acceleration for those orders are also indicated to the DVA operator numerically at 26. In addition, numerous additional displays of graphical and/or numerical information can also be provided to the DVA operator at 26.

Driveline torsional vibration is induced from two primary sources: engine torsionals occurring at the fundamental engine firing frequency and its harmonics, and universal joints operating with non-zero working angles. The drivetrain system responds to this torsional excitation by dynamically winding and unwinding. A certain amount of this torsional activity is always present and generally represents no danger to driveline components. However, if the excitation frequency is coincident with a driveline torsional resonant frequency, serious amplification of driveline torsionals can occur.

The driveline consists of numerous components which can be dynamically modeled as a discrete system containing spring and mass elements. In theory, the driveline will produce one resonant frequency for every degree of freedom in the mode. However, only the second torsional mode is considered herein since it is the only driveline resonant mode which is in the frequency range such that it is regularly excited by forced inputs from the engine and universal joints.

The second torsional mode is described as the transmission and axle rotating components torsionally sprung in phase on the clutch and shaft springs, with nodes at the flywheel and wheels. Although the front drive axle is generally the system anti-node, high torsional displacements can be consistently measured during resonance at the transmission output.

Data obtained at each rotational order of the driveshaft can be compared by ECU 22 to predetermined thresholds, above which torsional vibrations are deemed to be excessive. Measured vibrations above the preset threshold can be indicated visually to the DVA operator through flashing or colored display 24. The acceptable vibration threshold levels can be calculated or determined empirically and most likely will differ with combinations of driveline components.

Although various calculations can be made from the basic rotational speed measurements obtained, only those pertaining to the second torsional mode is preferably considered in this exemplary embodiment of DVA 10 since it is the only driveline resonant mode which is in the frequency range such that it is regularly excited by forced inputs from the engine and universal joints. However, DVA 10 is capable of evaluating higher and lower driveline torsional modes within the basic response limitations defined by the maximum vibration order and order resolution as discussed above. Second torsional mode typically ranges in frequency from 20–100 Hz, but most commonly occurs between 30–70 Hz in the high range transmission gears. The second mode increases in frequency as the transmission numerical gear ratio increases, resulting in the lowest resonant frequency in top gear. The resonant vibration amplitude is the highest in top gear and progressively decreases in amplitude for the lower gears.

The internal combustion engine is the most dominant torsional exciter in the driveline. The combustion process produces a dynamic torque waveform which creates oscillatory driveline dynamic torque and torsional displacements. The engine dynamic torque waveform is comprised mostly of the fundamental engine firing frequency, but there is also a measurable torque component at the 0.5, 1.5 and 2.0 harmonics of the engine firing frequency. For a typical four-cycle six cylinder engine, firing occurs three times per crankshaft revolution (3rd order). The 0.5, 1.5 and 2.0 harmonics would therefore represent the 1.5, 4.5 and 6.0 crankshaft orders, respectively.

The 4.5 and 6.0 crankshaft orders usually do not present a problem because they are too high in frequency to excite the driveline second torsional mode. However, if the third crankshaft order is coincident in frequency with the second torsional mode, significant resonant amplification can occur and therefore the third order is of particular interest. Similarly, the 1.5 crankshaft order excitation is also a concern because it will be coincident with the resonant frequency at some speed in the primary engine operating range. In some cases, the 1.5 crankshaft order excitation is of sufficient amplitude to create damaging cyclical loading and, therefore is also of interest.

Torsional effects of non-zero working angles in universal joints will include an oscillatory output rotational speed given a constant input velocity, varying at the rate of two cycles per shaft revolution. Therefore, second order accelerations are also of interest. Significant torsional accelerations in the second order are therefore indicative of non-zero U-joint working angles.

A universal joint offset by some working angle will produce torsional acceleration in the output yoke approximately equal to the joint angle squared, multiplied by the input yoke velocity squared. The torsional effect can be canceled by mounting the downstream u-join in phase and with the same operating angle. The m u-joints in series (and in phase), the approximate kinematic equation for the resultant output torsional acceleration is given by:

$$\frac{d^2\theta}{dt} = \varpi^2 * (\alpha_1^2 - \alpha_2^2 + \alpha_3^2 - \ldots + \alpha_m^2)$$

where ω=input shaft rotational speed (in radians/second) and α–joint working angle (in radians). The highest torsional acceleration will be obtained in top gear at the highest driveshaft speeds.

The drivetrain responds to such torsional excitations by dynamically winding and unwinding. A certain amount of this torsional activity is always present and represents no danger to driveline components. However, if the excitation frequency is coincident with a driveline torsional resonant frequency, serious amplification of driveline torsionals can occur. Excessive universal joint torsionals can cause steady state vibration problems as well as resonant excitation. The steady state problems typically occur at highway cruise speeds and cause excessive driveshaft and component torsional accelerations. If the joint torsionals are sufficient to excite the second torsional mode at the resonant speed, even higher torsional displacements can develop.

Figure 6:
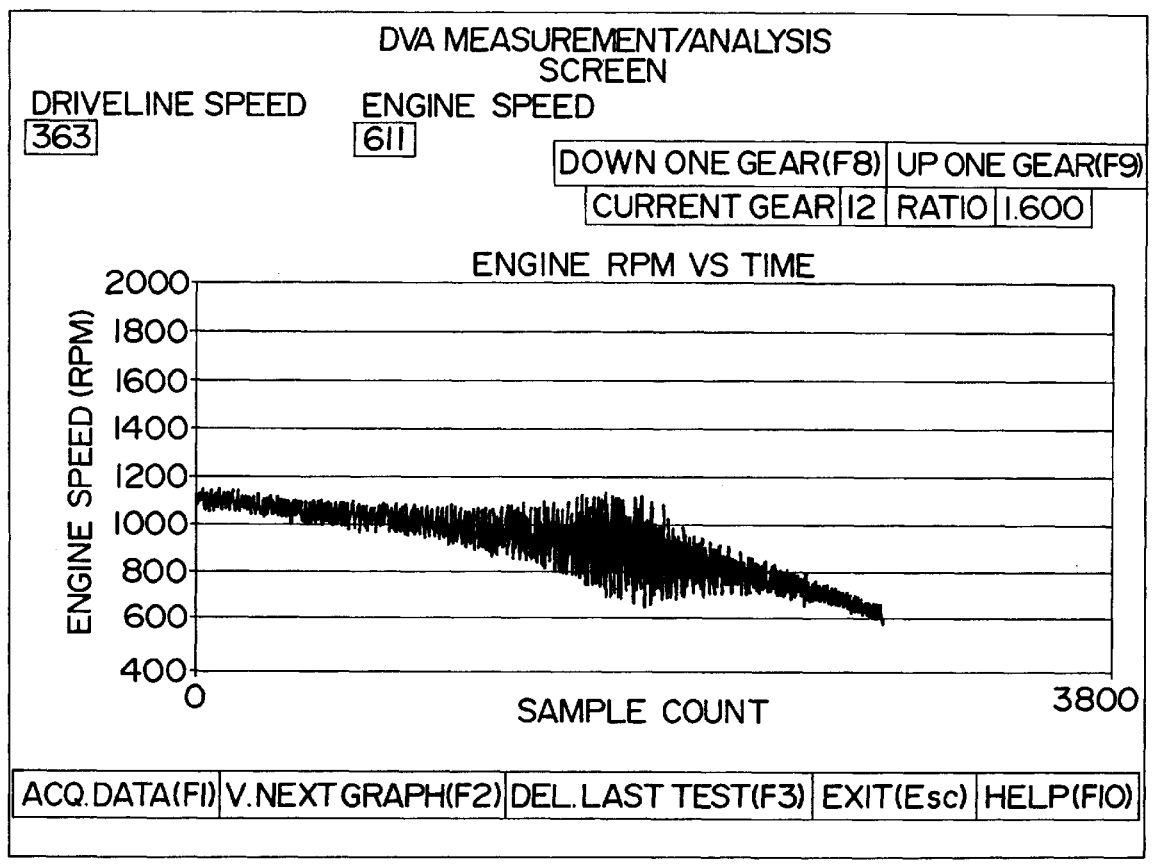
FIG. 6 is a graph produced by the DVA to indicate driveline vibration magnitudes in real time.

In order to use DVA 10, a DVA operator or test technician preferably connects lead 20 to sensor 12. The truck can be driven and data logged and stored in a memory device for later use or processed in real time. Preferably, a graph such as that shown in FIG. 6 is provided on display 24 in order to indicate in real time to the technician at what speed and in which gears torsional vibrations are most prevalent. This real time speed display preferably has sufficient response to indicate torsional activity in real time. FIG. 6 illustrates the real time display screen for a driveline experiencing engine firing excitation of the second driveline torsional mode. Using this screen, the DVA operator can quickly cycle through each transmission gear under varying operating conditions and loads in search of excessive torsionals (indicated by speed variations which exceed a certain limit). If excessive torsional activity is encountered, the DVA operator can immediately acquire data for further processing. This saves a great deal of time and eliminates the need to obtain large amounts of data at all speeds and gears.

Driveline torsional activity can be treated in several ways including reducing the amplitude of the excitation source, shifting the resonant speed below the engine's operating range or providing sufficient driveline damping to attenuate torsional response. The preferred treatment is dependent upon the nature of the problem. By using DVA 10 to identify the source of vibration, the appropriate remedy can be selected. Referring back to FIGS. 4 and 5, FIG. 4 illustrates measurements taken from a driveline exhibiting significant fourth order vibration. FIG. 5 illustrates measurements from the same driveline after appropriate dampening was achieved, with a significant decrease in fourth order vibration. Additional detail concerning this example are provided in the incorporated SAE paper. To increase accuracy, it may also be preferable to average data (as long as rotational speed remains constant) as well as to add data from the $1^{15}/_{16}$ order and $2^{1}/_{16}$ order with the 2.0 order data. The same may also be applied to information obtained at the other orders of interest as well.

DVA 10 thus provides a convenient and simple solution to many vehicle vibration problems. Sources of vibrations can be pinpointed thereby in order to eliminate expensive and inefficient trial and error driveline repair methods. DVA is configured to allow a vehicle to be tested and the results analyzed in only a couple of hours thereby minimizing vehicle downtime. Additionally, DVA 10 can also be used as an engineering tool to study torsional vibration in vehicle drivelines for use in driveline design as well as input to engine and transmission control algorithms.

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the invention as defined by the following claims.

What is claimed is:

1. A tool for measuring and analyzing the order based torsional vibration of a rotating component in a vehicle driveline comprising:

a sensor for measuring an instantaneous speed of a driveline component under test and generating speed signals;

a processor electrically coupled to said sensor for receiving said speed signals from said sensor and for transforming said speed signals into order domain and for processing said speed signals into rotational acceleration measurements as a function of harmonic order, said processing including calculating the amplitudes of said rotational acceleration measurements at each of one or more rotational orders; and display means for displaying said amplitudes of said rotational acceleration measurements with their respective rotational orders.

2. The tool of claim 1, wherein said rotating component in a vehicle driveline is a transmission output shaft.

3. The tool of claim 2, wherein said processing is performed using a fast Fourier transform.

4. The tool of claim 1, wherein said speed signals are also processed into torsional displacement.

\* \* \* \* \*